Dec. 3, 1968   W. E. BEHRNS   3,413,935
CONTAINER FOR IGNITING CHARCOAL AND THE LIKE
Filed March 28, 1966
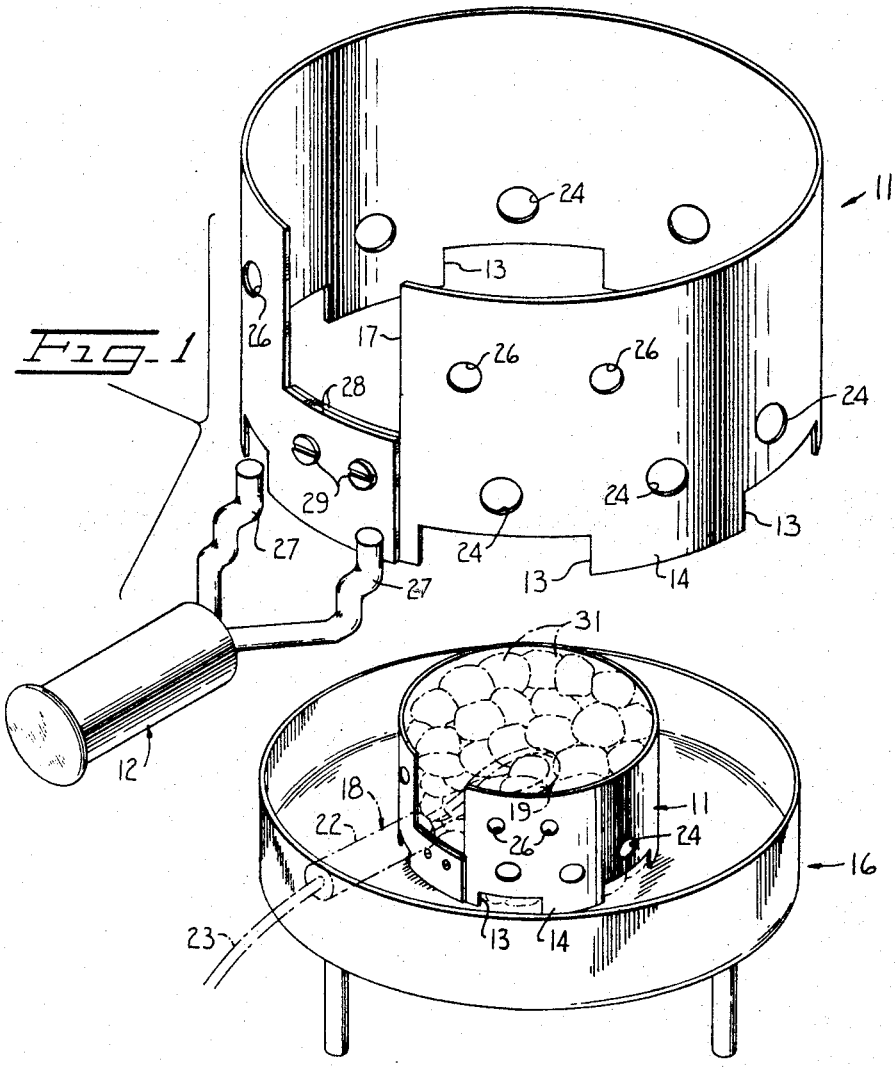
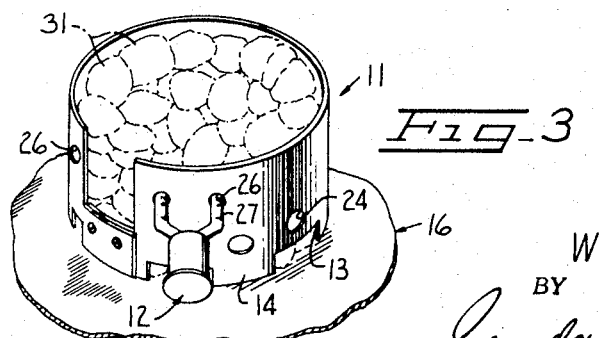
INVENTOR.
WILLIAM E. BEHRNS
BY
Gardner & Zimmerman
ATTORNEYS

United States Patent Office 3,413,935
Patented Dec. 3, 1968

3,413,935
CONTAINER FOR IGNITING CHARCOAL
AND THE LIKE
William E. Behrns, San Leandro, Calif., assignor of one-half to Burton E. Adams, San Leandro, Calif.
Filed Mar. 28, 1966, Ser. No. 537,904
3 Claims. (Cl. 110—1)

ABSTRACT OF THE DISCLOSURE

A container is described for facilitating the ignition of charcoal or the like in a barbeque brazier. The container is a tubular housing which is open at both ends and has a notch extending into its upper end edge to at least the central portion of the housing for the reception of the shank portion of an electric fire igniter. A plurality of circumferentially spaced perforations extend through the wall of the housing at positions which are spaced downwardly from the base of the notch so that air can enter into the housing below the location therein of the heating element of an electric igniter.

This invention relates generally to the ignition of charcoal, briquettes, etc., in barbeque braziers and the like, and is more particularly directed to a container for this purpose which is characterized by its simplicity of design and ease of construction.

Various devices have been heretofore devised to facilitate the holding of charcoal, briquettes, or equivalent fuel in compact relation in a barbeque brazier, or the like, for efficient ready ignition and initial burning. However, these known devices have various disadvantages which have apparently precluded their widespread acceptance. One class of prior device is provided as a tubular housing or container having a grate spaced upwardly from its lower end for supporting the fuel. The grate perforations, as well as perforations in the side wall of the housing, are of relatively complex stamped configuration adapted to channel air inwardly and upwardly through the housing. In this manner, an updraft of air is established to facilitate the efficient ignition and initial burning of the briquettes, or equivalent fuel compactly held within the housing. When the burning has progressed sufficiently to fully ignite the briquettes, the briquettes are delivered to the brazier, or other barbeque implement. By virtue of the grate, however, the device must be turned over to discharge the hot coals. This may be a dangerous maneuver. As a further disadvantage, the device is relatively difficult and costly to manufacture by virtue of the forming involved in providing the complex perforations and the joining operation required to secure the grate within the housing.

Another type of device for facilitating the ignition of charcoal, etc., has been provided as a tubular container having both ends open. Although the hot coals may be discharged from such a device by merely lifting same upward without requirement of turning the device over, some difficulty is encountered in establishing an effective updraft therethrough by virtue of the absence of a grate. In this regard, the updraft must be derived entirely from the sides of the container since the bottom is obstructed by the contained fuel. To channel air inwardly from the sides and upwardly through the container, previous devices have included an inner annular flange united to the container adjacent the lower end thereof and inclining inwardly and downwardly. The flange is provided with perforations and the wall of the container is provided with perforations outwardly adjacent the flange. Air flows inwardly through the container perforations and is channeled inwardly and upwardly through the container by the flange perforations. Although an effective updraft is thereby established, it will be appreciated that the incorporation of the flange adds materially to the cost of manufacturing the device, particularly because of the joining operation involved.

It is therefore an object of the present invention to provide a device for facilitating the ready ignition of charcoal, briquettes, or equivalent fuel, which is relatively simple and capable of being manufactured at very low cost.

Another object of the invention is the provision of a charcoal, etc., igniting container which, while being open at both ends to facilitate discharge of the coals by upward movement of the container, is yet effective to create an updraft with structure of extreme simplicity.

It is a further object of the invention to provide a container of the class decribed which is capable of being formed from a simple blank.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of a container and removable handle which comprise the charcoal ignition device of the present invention.

FIGURE 2 is a perspective view of the container as disposed in a barbeque brazier and operatively associated with an electric fire igniter to facilitate ignition and initial burning of charcoal within the container.

FIGURE 3 is a view similar to FIGURE 2, but with the fire igniter removed and the handle secured to the container to facilitate discharge of the hot coals to the brazier for spreading over the fire box thereof.

Referring now to FIGURE 1, a device in accordance with the present invention for facilitating the ignition and initial burning of charcoal, briquettes, or the like, will be seen to include a container 11, and preferably a handle 12 for removable securance thereto. The container is preferably of cylindrical tubular configuration open at both ends. The lower edge of the container is provided with a plurality of preferably rectangular circumferentially spaced notches 13 defining legs 14 for supporting the container on the surface of the firebox of a barbeque brazier 16, or the like, as depicted in FIGURE 2. A rectangular notch 17 extends downwardly from the upper edge of the container to the central portion thereof to receive and support a conventional electric fire igniter 18. Such an igniter typically includes an eye shaped heating element 19 with a shank portion 21 projecting from a handle 22, and a power cord 23 extending into the handle into connection with the heating element. The notch 17 is designed such that the shank portion 21 extends through the notch and rests upon the base thereof to thus support the heating element within the container at a substantially central location.

The container 11 is also provided with a plurality of circumferentially spaced perforations 24. It is of particular importance to note that these perforations are arranged in a single row at a level in close downwardly spaced relation to the base of the notch 17. The perforations serve to introduce air to the container interior at points which are subjacent the heating element 19 of the igniter 18 when same is operatively associated with the container. When fuel is ignited by the igniter a partial vacuum is established in the vicinity thereof by virtue of the air being consumed in supporting combustion. The air entering the perforations beneath the heating element is thus drawn upwardly into the region of partial vacuum and establishes an updraft. The absence of perforations in the portions of the container above the heating element enables the air to flow freely upward. In this regard, if perforations were provided above the heating element there would be a tendency for air entering same to flow downwardly toward the region of partial vacuum and thereby impede the updraft. Since there are no upper perforations, a highly effective updraft is obtained with the container of the present invention.

To facilitate removable securance of the handle 12, the container 11 is provided with a pair of spaced apertures 26 adjacent the notch 17. The handle 12 is then provided with a pair of prongs 27 projecting right-angularly therefrom. Preferably, the prongs are stepped for ease of insertion through the apertures and firm engagement with the exterior and interior surfaces of the container. When the prongs are inserted and rocked back into engagement with the interior and exterior surfaces of the container, as shown in FIGURE 3, the handle is in securance with the container. Subsequent to the ignition and initial burning of charcoal, or the like, within the container, the handle may be thus secured to the hot container to facilitate its removal from the brazier.

It will be appreciated that the container 11 may be simply formed from a substantially rectangular blank of sheet metal. In this regard, the notches 13, perforations 24, apertures 26, and notch 17 may be formed in a single blanking operation. The notch 17 is preferably provided as open-ended rectangular cut-outs at the opposite ends of the blank. The blank is then bent about a cylindrical mandrel, or is otherwise formed into a cylindrical configuration with the portions 28 of the blank underlying the end cut-outs overlapping. The overlapped portions 28 are next fastened together as by means of sheet metal screws 29 to thus provide the completed container.

In the use of the device of the present invention, the container 11 is placed in the brazier 16 with the legs 14 resting upon the surface of the fire box. Briquettes 31, charcoal, or equivalent fuel is placed in the container to substantially the level of the base of notch 17. The igniter 18 is engaged with the notch 17, the heating element 19 thereof resting upon the briquettes. Additional briquettes are placed in the container on top of the heating element. The igniter is turned on to thus heat the underlying and overlying layers of briquettes and ignite same. The updraft established by air entering the perforations 24 at a level immediately subjacent the heating element of the igniter is effective in causing ignition and initial burning of the adjacent layers of briquettes to proceed rapidly. Additional air enters through the notches 13. Ignition and burning of the briquettes spreads upwardly and downwardly from the igniter, layer by layer. By virtue of the briquettes being held in compact relation within the container, and the updraft of air established therethrough, all of the briquettes are soon ignited and burning. The igniter is then removed, and the handle 12 is secured to the container. The container is lifted upward by grasping the handle to thereby discharge the burning briquettes to the fire box of the brazier.

It will be appreciated that means other than an electric igniter may be employed to ignite the briquettes, etc., within the container 11. For example, the briquettes may be saturated with a liquid fire igniter. However, the electric igniter is preferred since two layers of briquettes can be thereby ignited simultaneously with the result that ignition and burning of all briquettes is accomplished more rapidly.

What is claimed is:

1. A device for facilitating the ignition of pieces of solid fuel such as charcoal, briquettes, etc., comprising a tubular container open at both ends and free of obstructions to the free flow of said fuel therethrough, said container having an open ended notch extending into the upper end edge thereof to at least the central portion of the container for the reception of the shank portion of an electric fire igniter, and said container having a plurality of circumferentially spaced perforations through the wall thereof at positions spaced downwardly from the base of said notch for the entry of air into said container at locations below the position therein for the heating element of an electric igniter.

2. A device according to claim 1, further defined by said container having a pair of spaced-apart apertures, and a handle having a pair of prongs projecting right-angularly therefrom and releasably engaged in said apertures, said prongs and apertures being means for removably securing the handle to the container.

3. A device according to claim 1 wherein said tubular container is made from a blank of sheet metal having overlapping end portions secured together subjacent said notch to provide a double thickness of said sheet metal at the base of said notch for added structural strength in supporting the shank portion of an electric igniter.

References Cited

UNITED STATES PATENTS

| 859,030 | 7/1907 | Walker et al. | 126—25 |
| 2,938,988 | 5/1960 | McCutcheon et al. | 219—32 |
| 3,121,408 | 2/1964 | Haning | 110—1 |
| 3,122,109 | 2/1964 | Waugh | 110—1 |

OTHER REFERENCES

Charco Blazer, advertisement, p. 238, January 1959, Housewares Review.

FREDERICK KETTERER, *Primary Examiner.*